(12) United States Patent
Nagashima et al.

(10) Patent No.: US 8,727,431 B2
(45) Date of Patent: May 20, 2014

(54) SUNSHADE STOPPER (71) Applicants: Youji Nagashima, Kariya (JP); Masaji Ishikawa, Toyoake (JP)

(72) Inventors: Youji Nagashima, Kariya (JP); Masaji Ishikawa, Toyoake (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 13/658,145

(22) Filed: Oct. 23, 2012

(65) Prior Publication Data

US 2013/0099522 A1 Apr. 25, 2013

(30) Foreign Application Priority Data

Oct. 24, 2011 (JP) .................................. 2011-233291

(51) Int. Cl.
*B60J 3/02* (2006.01)

(52) U.S. Cl.
USPC ........................................................ 296/214

(58) Field of Classification Search
USPC ........................................................ 296/214
See application file for complete search history.

(56) References Cited

U.S. PATENT DOCUMENTS

| | | | | |
|---|---|---|---|---|
| 6,299,245 B1 * | 10/2001 | Thiele et al. | ................... | 296/214 |
| 6,386,626 B1 * | 5/2002 | Makino et al. | ................. | 296/214 |
| 8,141,941 B2 * | 3/2012 | Fraley | ........................... | 296/214 |

FOREIGN PATENT DOCUMENTS

| | | | |
|---|---|---|---|
| JP | 6-320956 | | 11/1994 |
| JP | 8-34240 | * | 2/1996 |
| JP | 2005-297774 | * | 10/2005 |

* cited by examiner

*Primary Examiner* — Dennis H Pedder
(74) *Attorney, Agent, or Firm* — Finnegan, Henderson, Farabow, Garrett & Dunner, LLP (57) ABSTRACT

A sunshade stopper is provided at a housing connecting a pair of guide rails that slidably supports a sunshade on a ceiling of a vehicle interior. The sunshade stopper includes a corresponding portion arranged at a position corresponding to an end portion of the sunshade during the sunshade is at the closed position, at least one contact portion provided on the corresponding portion that makes contact with at least a portion of the end portion of the sunshade during the sunshade is at the closed position, the contact portion formed with a form fitting the end portion of the sunshade that makes contact with the contact portion, and an attaching portion configured to be fixed to a vehicle, provided at a position in a direction opposite to where the ceiling is provided relative to the corresponding portion and extending in a direction in which the sunshade opens.

4 Claims, 8 Drawing Sheets

SUNSHADE STOPPER

CROSS REFERENCE TO RELATED APPLICATIONS

This application is based on and claims priority under 35 U.S.C. §119 to Japanese Patent Application 2011-233291, filed on Oct. 24, 2011, the entire content of which is incorporated herein by reference.

TECHNICAL FIELD

This disclosure generally relates to a sunshade stopper.

BACKGROUND DISCUSSION

At an opening formed on a roof of a vehicle, a transparent panel is fixed or a transparent movable panel is provided. A sunshade apparatus is provided at a vehicle interior side of the opening. A sunshade apparatus is an apparatus including guide rails and a sunshade that slides along the guide rails. By opening and closing the sunshade relative to the opening, an amount of light in the vehicle interior is adjusted.

In a sunshade apparatus in JP2005-297774A, hereinafter referred to as Reference 1, sunshade stoppers are provided within guide rails. The sunshade stoppers are provided for stopping a sunshade at a closed position on closing the sunshade.

In a sunshade apparatus in JPH6-320956A, hereinafter referred to as Reference 2, sunshade stoppers where end portions of a sunshade come into contact are provided on portions of a vehicle body.

In the sunshade apparatus in Reference 1, each of the sunshade stoppers is provided within the guide rail. Accordingly, a contact area between the sunshade stopper and the sunshade is limited to a small area. With an arrangement where the contact area between the sunshade stopper and the sunshade is small, stopping the sunshade stably at the closed position may become difficult.

In the sunshade apparatus in Reference 2, the sunshade stoppers are provided on the vehicle body. Accordingly, an amount of the contact area between the sunshade stopper and the sunshade varies depending on a form of the vehicle body. Providing an adequate contact area is not a consideration for the sunshade, the sunshade stopper or other arrangements in the sunshade apparatus in Reference 2. Accordingly, the sunshade and the sunshade stopper may make contact with each other in a point or in a line instead of making surface contact with each other. As with Reference 1, the arrangement described in Reference 2 is difficult in stopping the sunshade stably at the closed position.

A need thus exists for a sunshade stopper, which is not susceptible to the drawback mentioned above.

SUMMARY

A sunshade stopper is provided at a housing connecting a pair of guide rails that supports a sunshade to slide between its open and closed positions relative to a ceiling of a vehicle interior and provides an open position and a closed position of the sunshade. The sunshade stopper is arranged at a position to make contact with an end portion of the sunshade during the sunshade is at the closed position. The sunshade stopper includes a corresponding portion arranged at a position corresponding to the end portion of the sunshade during the sunshade is at the closed position. The sunshade stopper also includes at least one contact portion provided on the corresponding portion that makes contact with at least a portion of the end portion of the sunshade during the sunshade is at the closed position, the contact portion formed with a form fitting the end portion of the sunshade that makes contact with the contact portion 31. The sunshade stopper further includes an attaching portion configured to be fixed to a vehicle, provided at a position in a direction opposite to where the ceiling is provided relative to the corresponding portion and extending in a direction in which the sunshade opens.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
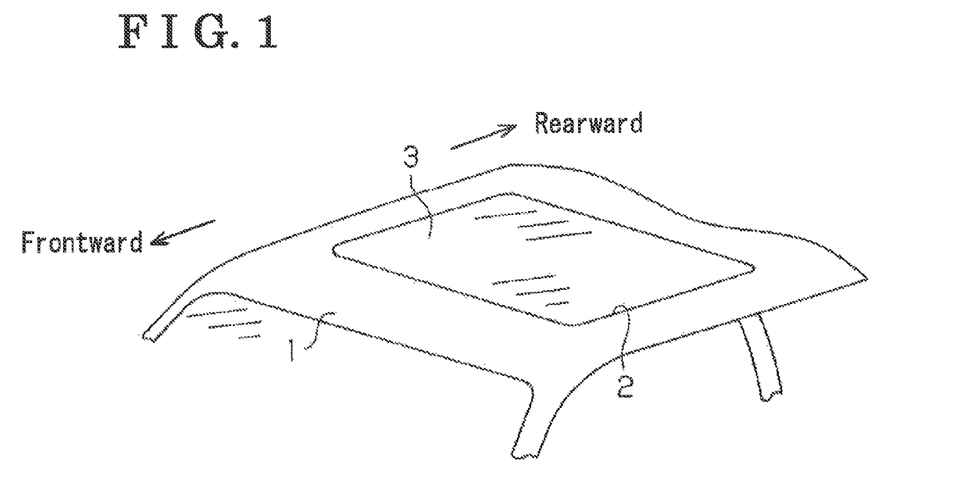
FIG. 1 is a perspective view illustrating a roof of a vehicle where a sunshade stopper according to a first embodiment is provided.

A sunshade stopper according to a first embodiment will be described referring to FIGS. 1 to 8. As FIG. 1 illustrates, a roof opening 2 formed in a substantially quadrilateral is provided on a roof 1 of a vehicle. In the roof opening 2, a movable panel 3 is installed. The movable panel 3 allows sunlight, or lights from other sources, to penetrate through. At a portion in a vehicle interior corresponding to the roof opening 2, a sunshade apparatus 10 is arranged so that the sunlight, or the lights from other sources, penetrated through the movable panel 3 is blocked.

Figure 2:
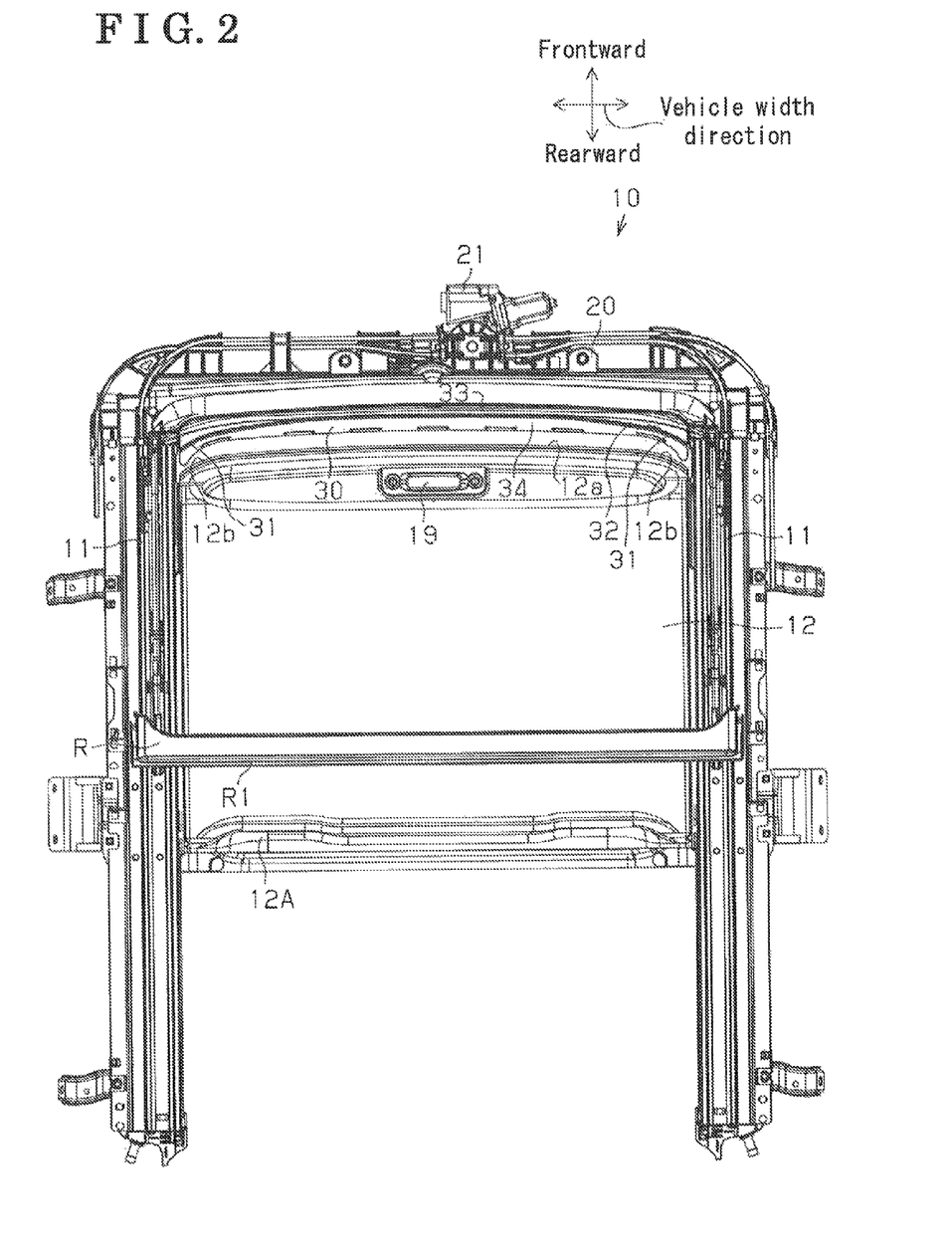
FIG. 2 is a top view of a sunshade apparatus provided with the sunshade stopper according to the first embodiment.

As FIG. 2 illustrates, the sunshade apparatus 10 includes guide rails 11, a front housing 20, which serves as a housing, and a sunshade 12. The guide rails 11, each of which is formed by extrusion of an aluminum alloy, or formed by similar method and material, extend in a frontward and rearward direction of the vehicle. The guide rails 11 are arranged in a pair such that each of the guide rails 11 is at a position opposing each other in a vehicle width direction. The front housing 20 attaches to a front end portion of each of the guide rails 11 such that the front housing 20 is connecting between the front end portion of each of the guide rails 11.

The sunshade 12 is formed, for example, with a multiple layer of resin materials. The sunshade 12 moves along the guide rails 11 in a frontward and rearward direction of the vehicle. More specifically, the sunshade 12 moves to and from a closed position that covers the roof opening 2 and an open position that exposes the roof opening 2.

The front housing 20 is internally provided with a motor 21. The motor 21 in an activated state moves a belt, which extends in the front housing 20 and the guide rails 11, and functional parts, which are connected to the belt, along a direction along which the guide rails 11 extend. The functional parts are connected to the movable panel 3 such that the movable panel 3 tilts upward from a totally closed position in a state where the motor 21 is driven in one direction. By driving the motor 21 in the other direction, the movable panel 3 makes a tilt down movement from the totally closed position and then slides in the rearward direction. The arrangement described herewith works to open or close the movable panel 3. The functional parts are connected with a rain channel R. The rain channel R moves in the rearward direction of the vehicle together with the movement of the movable panel 3 in the rearward direction. At a rearward portion of the sunshade 12, a projected portion 12A projecting in an upward direction of the vehicle is provided such that the rearward portion R1 of the rain channel R may contact with the projected portion 12A. Accordingly, at an occasion at which the movable panel 3 makes the tilt down movement from the totally closed position and then slides in the rearward direction of the vehicle, the sunshade 12 slides in the rearward direction simultaneously so that the sunshade 12 is automatically opened.

At an inner surface of the sunshade 12, which is the surface in the vehicle interior side, a handle 19 is formed. The sunshade 12 is manually moved to and from between the closed position and the open position through the usage of the handle 19.

Figure 5:
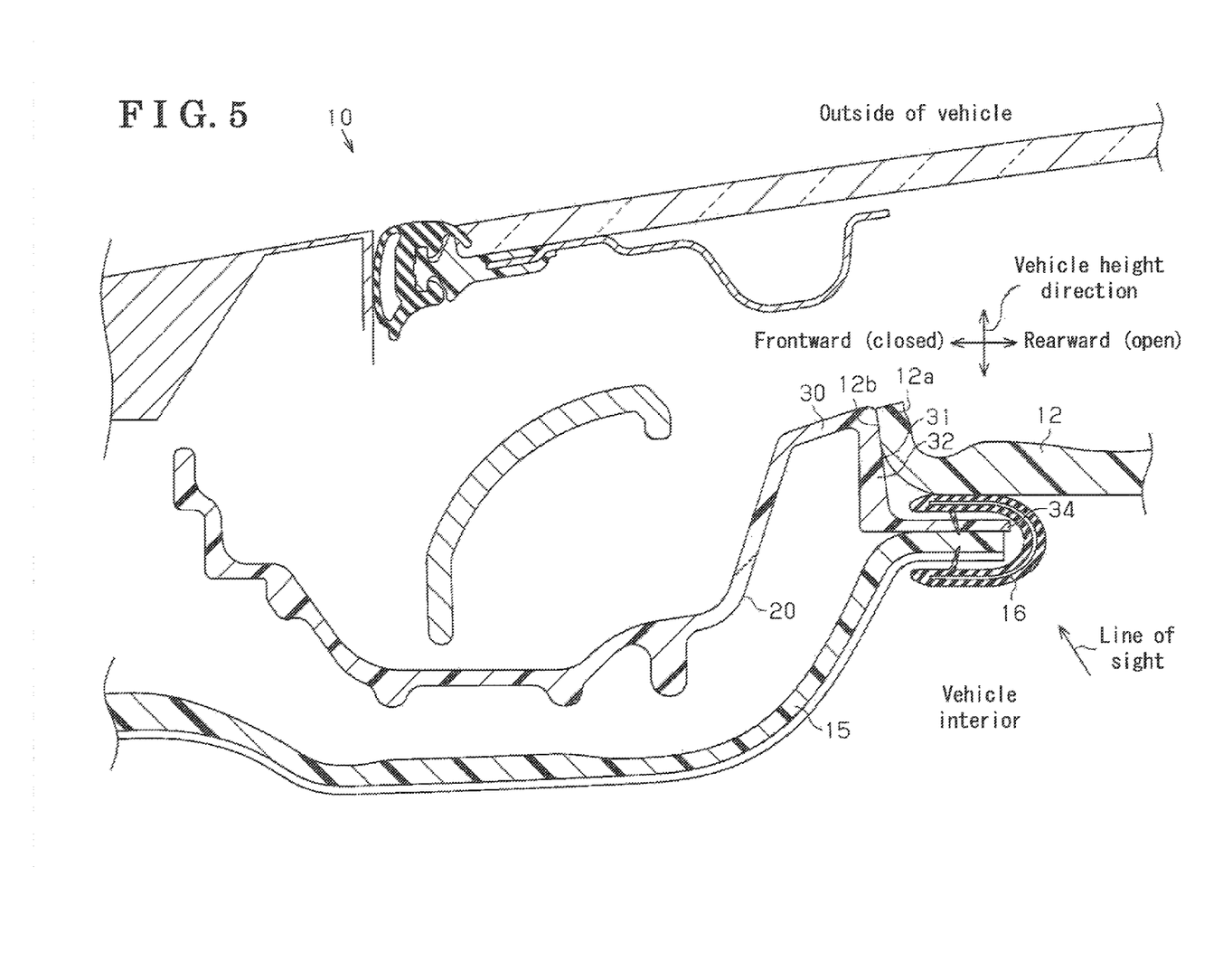
FIG. 5 is a cross-sectional view of the sunshade stopper according to the first embodiment taken along line V-V in FIG. 3.

As FIG. 5 illustrates, a front end portion 12a of the sunshade 12, the front end portion 12a which serves as an end portion of the sunshade 12, is formed such that the front end portion 12a is rolled back and heading in the upward direction relative to the upper surface of the sunshade 12. In other words, the front end portion 12a is formed along a line in a vehicle height direction.

Figure 3:
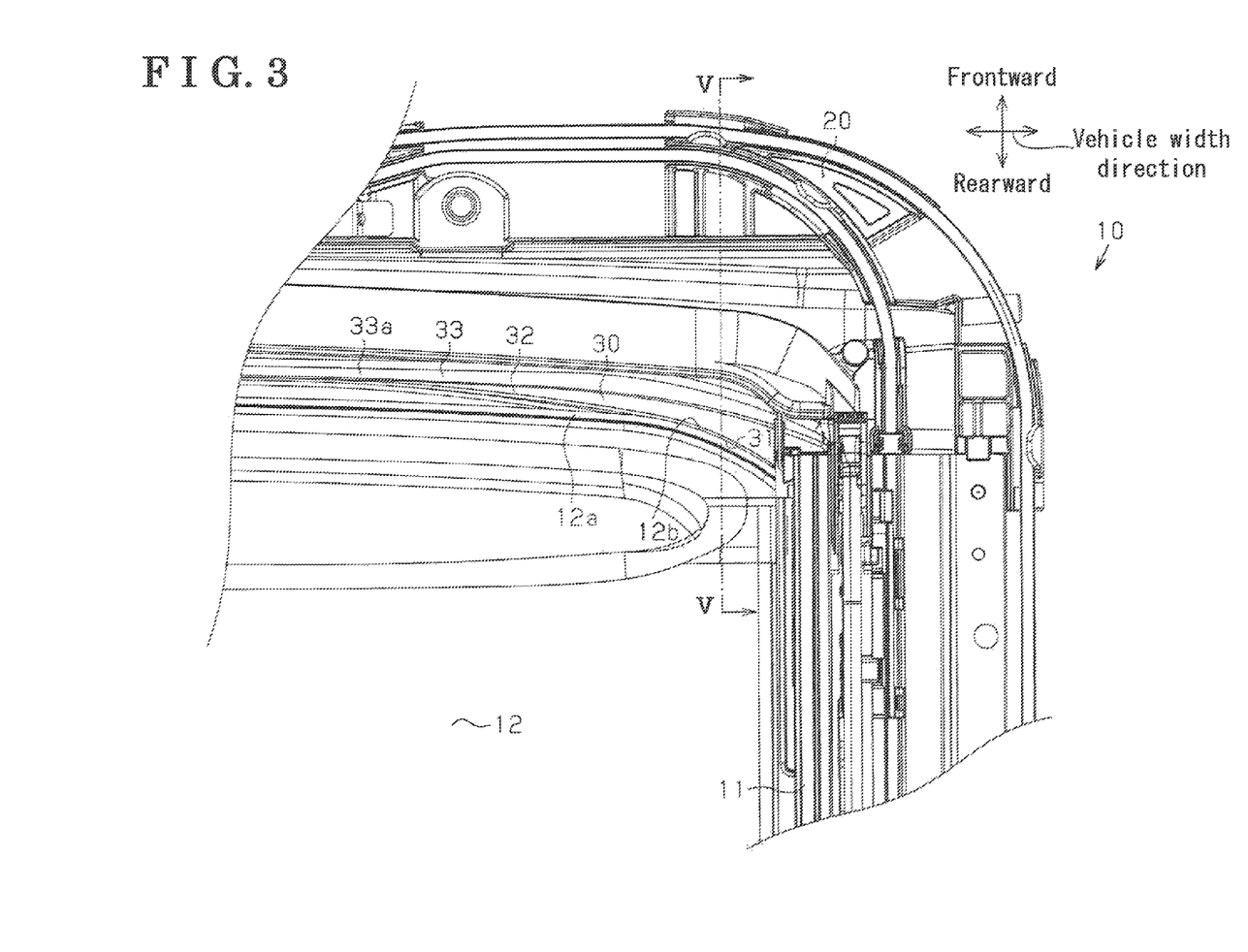
FIG. 3 is a drawing with a portion of the sunshade apparatus in FIG. 2 with a sunshade at a closed position being enlarged.
Figure 4:
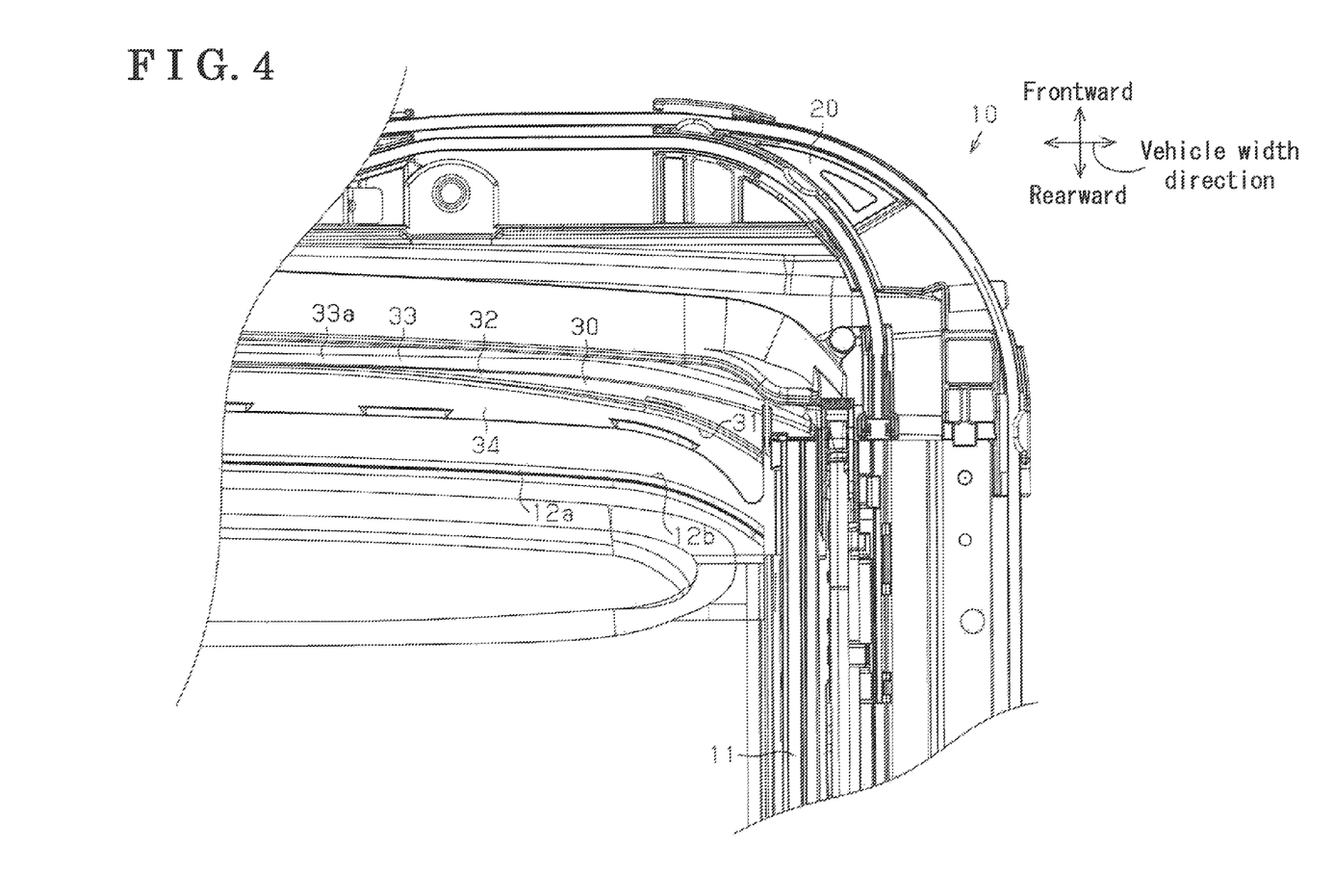
FIG. 4 is a drawing with a portion of the sunshade apparatus in FIG. 2 with the sunshade at an open position being enlarged.

As FIGS. 3 and 4 illustrate, the front end portion 12a of the sunshade 12 is formed with curved surfaces 12b, which are the curved surfaces provided on the sunshade 12. Each of the curved surfaces 12b is formed at an end portion of the front end portion 12a, the end portion in a direction of each of the guide rails 11. Each of the curved surfaces 12b is formed such that a distance between the curved surface 12b and the front housing 20 increases as a position in the curved surface 12b as being closer to the guide rail 11 nearby. FIG. 3 is a top view illustrating the sunshade 12 in a state where the sunshade 12 is at the closed position. FIG. 4 is a top view illustrating the sunshade 12 in a state where the sunshade 12 is opened slightly.

As FIG. 2 illustrates, a sunshade stopper 30 is provided at the front housing 20. The sunshade stopper 30 is integrally formed with other portions of the housing 20 that is made of resin by injection molding. The sunshade stopper 30 is formed with a form corresponding to the front end portion 12a of the sunshade 12.

Figure 6:
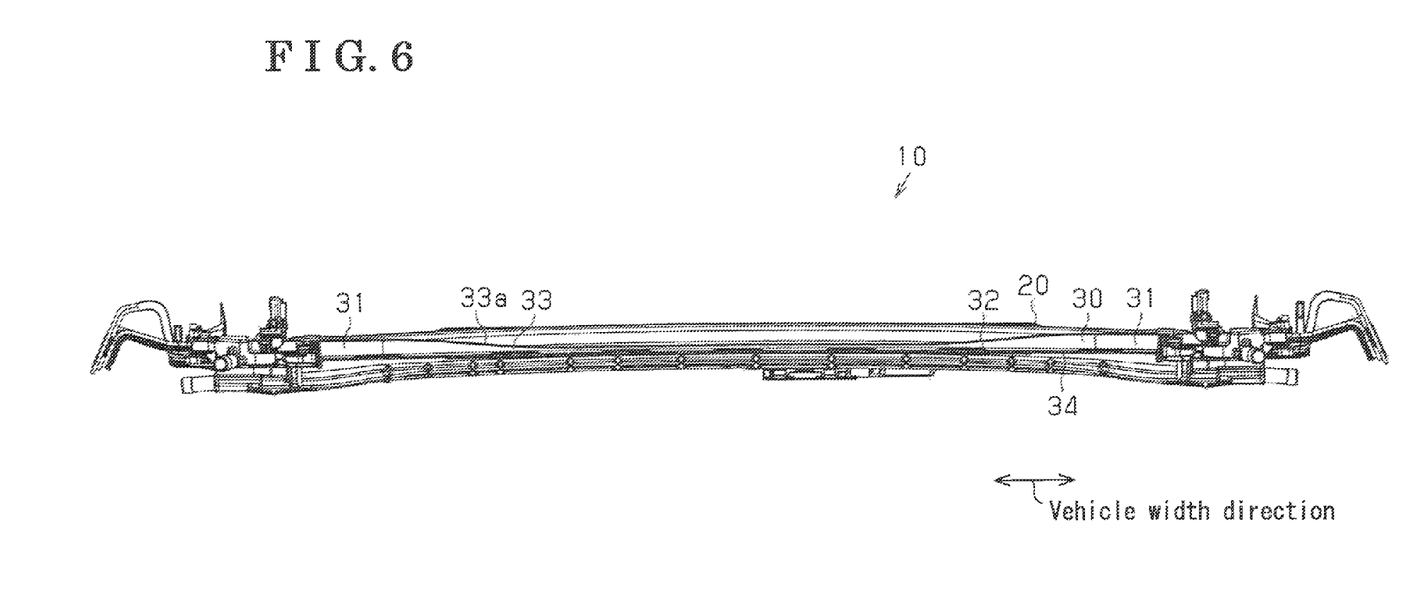
FIG. 6 is a front view of a front housing provided with the sunshade stopper according to the first embodiment.

More specifically, the sunshade stopper 30 includes a corresponding portion 32 and an attaching portion 34. As FIG. 6 illustrates, the corresponding portion 32 extends in the vehicle width direction to correspond with the front end portion 12a of the sunshade 12. At opposing end portions of the corresponding portion 32, curved surfaces 31, which are the curved surfaces provided on the sunshade stopper 30, fitting the curved surfaces 12b, which are the curved surfaces provided on the sunshade 12. The curved surface 31 serves as a contact portion. As FIGS. 3 and 8 illustrate, in a state where the sunshade 12 is at the closed position, each of the curved surfaces 12b and the corresponding curved surface 31 make surface contact with each other.

As FIG. 5 illustrates, the attaching portion 34 is provided at a position below the corresponding portion 32 and extends in a direction in which the sunshade 12 opens, which is in a right direction of the drawing. The attaching portion 34 attaches to a trim 15 provided on a ceiling of the vehicle interior, attached by using bundling members 16. Accordingly, the sunshade stopper 30, furthermore the front housing 20, is retained to the vehicle. As an arrow indicating a line of sight in FIG. 5 illustrates, the attaching portion 34 arranged between the corresponding portion 32 and the vehicle interior restrains a user in the vehicle interior from sighting and recognizing the corresponding portion 32 with naked eyes.

Figure 8:
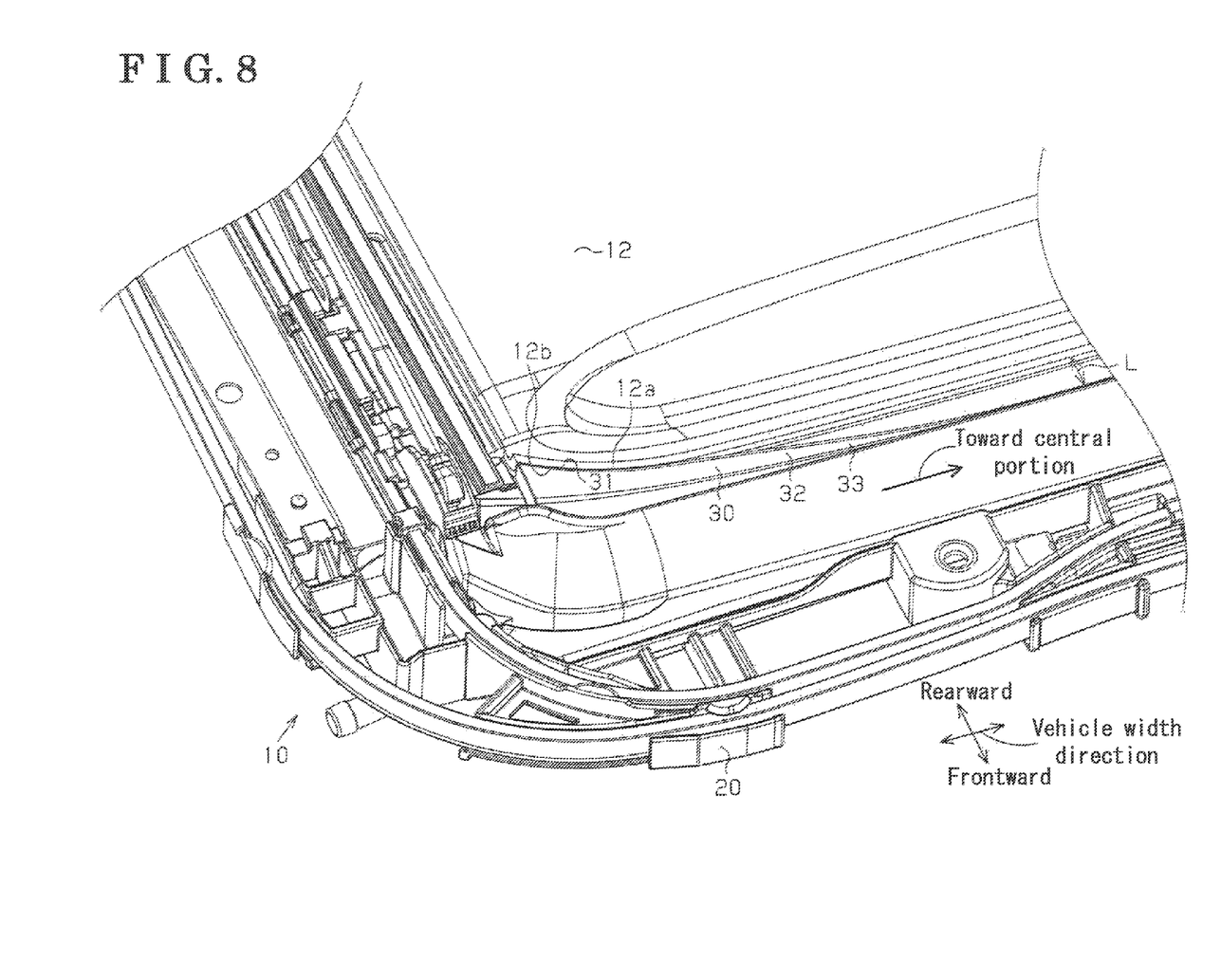
FIG. 8 is a perspective view of the sunshade apparatus provided with the sunshade stopper according to the first embodiment in a state where the sunshade is at the closed position.

As FIG. 8 illustrates, the corresponding portion 32 is formed with a curved portion 33, the portion formed with a form that increases a distance between the curved portion 33 and the front end portion 12a of the sunshade 12 as a position in the curved portion 33 as being closer to the central portion in the vehicle width direction. In other words, a clearance L, which is a separation distance between the curved portion 33 and the front end portion 12a of the sunshade 12, becomes maximum at the central portion of the curved portion 33. The clearance L becomes smaller as a position in the curved portion 33 as being closer to each of the guide rails 11. The clearance L becomes zero when the position in the curved portion 33 reaches the curved surface 31.

As FIG. 6 illustrates, the curved portion 33 is formed with an upper surface portion 33a. A height of the upper surface portion 33a becomes gradually lower as the position in the curved portion 33 as being closer to the central portion in the vehicle width direction away from each of the guide rails 11.

Figure 7:
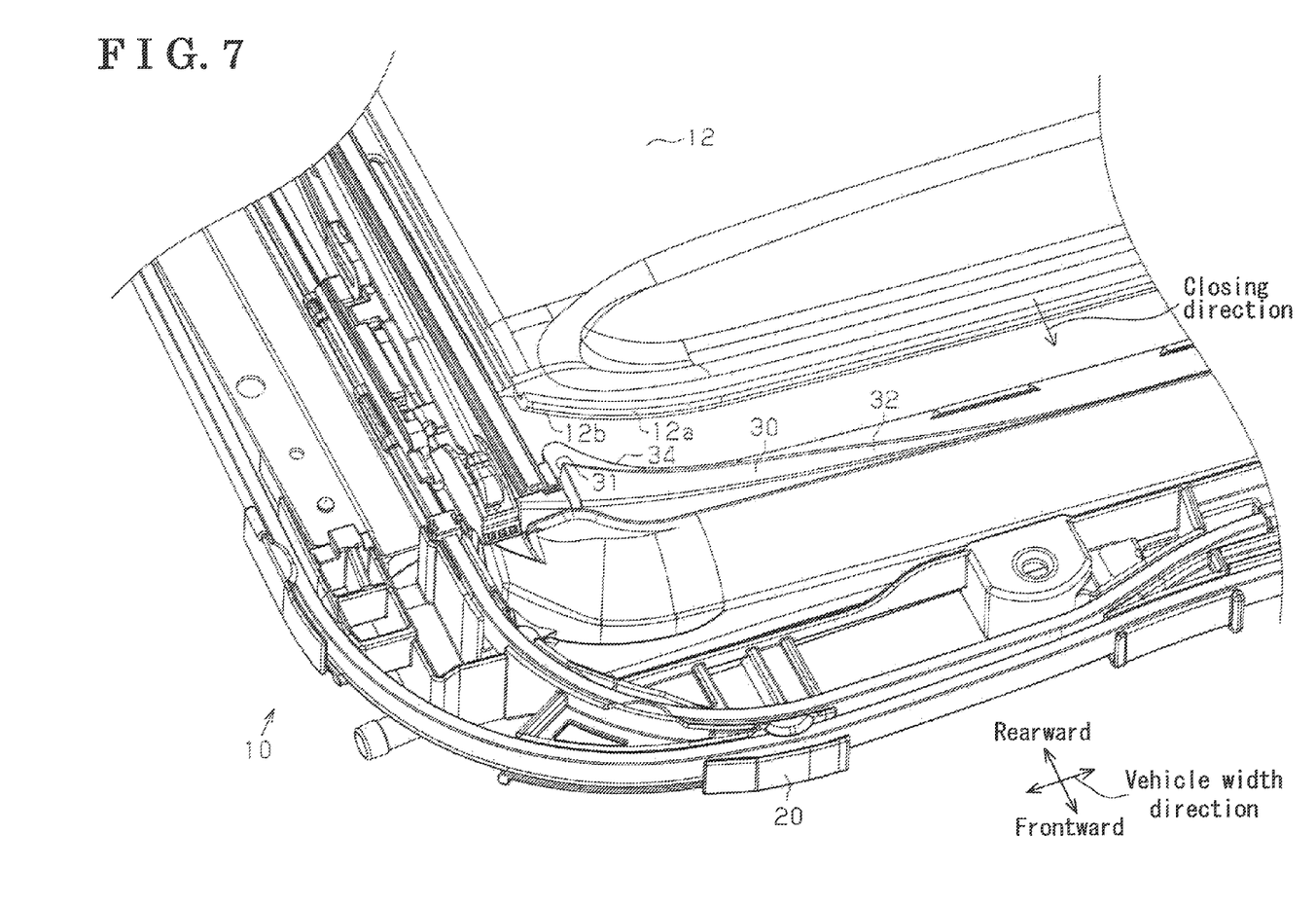
FIG. 7 is a perspective view of the sunshade apparatus provided with the sunshade stopper according to the first embodiment in a state where the sunshade is at an open position.

The arrangement described herewith operates as follows. As FIG. 7 illustrates, by using the handle 19, the sunshade 12 in a state at the open position is manually moved in a direction in which the sunshade 12 closes. As FIG. 8 illustrates, the sunshade 12 that reached the closed position provides a state in which each of the curved surfaces 12b and the corresponding curved surface 31 make surface contact with each other. Accordingly, a movement of the sunshade 12 in the closing direction is restrained.

The sunshade stopper according to the first embodiment is advantageous in following respects. The curved surfaces 31 provided on the sunshade stopper 30 in the corresponding portion 32, each of the curved surfaces 31 that serves as a contact portion, is formed with a form fitting the corresponding curved surface 12b provided at the front end portion 12a of the sunshade 12. Accordingly, an amount of contact area between the sunshade 12 at the closed position and the sunshade stopper 30 is increased. As a result, the sunshade stopper 30 stably stops the sunshade 12 at the closed position.

The sunshade stopper 30, furthermore the front housing 20, is retained to the trim 15 at the attaching portion 34. The attaching portion 34 is provided at a position in a direction opposite to where the ceiling is provided relative to the corresponding portion 32 and extends in the direction in which the sunshade 12 opens. Accordingly, the attaching portion 34 restrains the corresponding portion 32 from being sighted and recognized from the vehicle interior. In other words, the attaching portion 34 functions as a blinder. As a result, a look of the sunshade stopper 30 viewed from the vehicle interior is enhanced.

Increasing the amount of contact area between the sunshade stopper 30 and the sunshade 12 decreases a noise generating at the time the sunshade 12 comes into contact with the sunshade stopper 30. Increasing the amount of contact area between the sunshade stopper 30 and the sunshade 12 also decreases a force that applies per unit area applied on the sunshade stopper 30, so that a durability of the sunshade stopper 30 is increased. Decreasing the force that applies per unit area is advantageous in forming a portion serving as the curved surface 31 provided on the sunshade stopper 30 to be formed thinner and provides the sunshade stopper 30 with a simpler configuration.

The sunshade stopper 30 is made of resin and is formed by injection molding. Accordingly, the sunshade stopper 30 may be provided with a form fitting the front end portion 12a of the sunshade 12 with less effort compared with the case with which the sunshade stopper 30 is provided with other manufacturing method requiring cutting processes, or similar manufacturing method.

Upon arrangement described herewith, the sunshade stopper 30 according to the first embodiment provides the sunshade stopper 30 that stops the sunshade 12 stably at the closed position with less manpower relative to a sunshade stopper arrangement that provides sunshade stoppers in the guide rails. In a state where the sunshade 12 is at an open position, the central portion of the sunshade stopper 30, which is the central portion of the corresponding portion 32, is relatively easy to sight and recognize from the vehicle interior. The sunshade stopper 30 is formed with the curved portion 33 formed such that the distance between the curved portion 33 and the front end portion 12a of the sunshade 12 increases as the position in the curved portion 33 as being closer to the central portion. Accordingly, even in a state where the sunshade 12 is at the open position, the attaching portion 34 provides a state where the curved portion 33 is at a position restrained from being sighted and recognized by the user in the vehicle interior. Accordingly, the look of the sunshade stopper 30 viewed from the vehicle interior is enhanced.

The curved portion 33 is formed with the upper surface portion 33a where the height of the upper surface portion 33a becomes gradually lower as the position in the upper surface portion 33a as being closer to the central portion in the vehicle width direction away from each of the guide rails 11. Accordingly, even in a state where the sunshade 12 is at the open position, the attaching portion 34 provides a state where the curved portion 33 is at a position restrained from being viewed and recognized by the user in the vehicle interior. Accordingly, the look of the sunshade stopper 30 viewed from the vehicle interior is enhanced.

Each of the curved surfaces 31 provided on the sunshade stopper 30 is formed at each of the opposing end portions of the corresponding portion 32. Accordingly, the sunshade 12 is restrained from being in a state in which the contact with the sunshade stopper 30 as being at one end only. The sunshade 12 makes contact with each of the curved surfaces 31 so that the sunshade stopper 30 stably stops the sunshade 12 at the closed position.

The curved surfaces 31 provided on the sunshade stopper 30 is configured so that each of the curved surfaces 31 is formed in a form that increases extending length in the direction in which the sunshade 12 opens as a position in each of the curved surfaces 31 as being closer to the guide rail 11 nearby. Each of the curved surfaces 31 restrains the sunshade 12 at the closed position from misalignment in the vehicle width direction. Accordingly, the sunshade stopper 30 stably stops the sunshade 12 at the closed position.

The front end portion 12a of the sunshade 12 including the curved surfaces 12b provided on the sunshade 12 is rolled back such that the front end portion 12a including the curved surfaces 12b heads in the upward direction of the vehicle. Accordingly, outward surfaces of the rolled back portion of the curved surfaces 12b and the corresponding curved surfaces 31 provided on the sunshade stopper 30 make surface contact with each other during the sunshade 12 is at the closed position. As a result, the amount of contact area between the sunshade 12 and the sunshade stopper 30 is increased. Accordingly, the sunshade stopper 30 stably stops the sunshade 12 at the closed position.

The sunshade stopper 30 according to the first embodiment may be modified in following manners. The front housing 20 where the sunshade stopper 30 according to the first embodiment is provided is arranged at a position in the frontward direction of the vehicle relative to the guide rails 11 in the sunshade stopper 30 according to the first embodiment, however, the front housing 20 may be arranged at a position in the rearward direction of the vehicle relative to the guide rails 11. In the arrangement described herewith, the sunshade 12 closes in the rearward direction of the vehicle.

The motor 21 in the detailed description of the sunshade stopper 30 according to the first embodiment is arranged at a position in the frontward direction of the vehicle relative to the guide rails 11, however, the motor 21 may be retained on a rear housing arranged at a position in the rearward direction of the vehicle relative to the guide rails 11. In other words, the component that retains the motor 21 is not limited to the front housing 20 if the component that retains the motor 21 is a component that connects between the guide rails 11. In the arrangement described herewith, the sunshade 12 closes in the frontward direction of the vehicle.

The sunshade 12 in the detailed description of the sunshade stopper 30 according to the first embodiment is the sunshade 12 that opened and closed manually, however, the sunshade 12 may be opened or closed by driving a motor for the sunshade 12, or using a similar device. In the arrangement described herewith, the front housing 20 may retain the motor for the sunshade 12. The front housing 20 retaining the motor for the sunshade 12 may or may not retain the motor 21.

The guide rails 11 in the detailed description of the sunshade stopper 30 according to the first embodiment are components that movably support the sunshade 12 and the movable panel 3, however, the guide rails 11 may be components that movably support the sunshade 12 and not the components that movably support the movable panel 3.

The sunshade stopper 30 according to the first embodiment is provided with a pair of curved surfaces 31 provided on the sunshade stopper 30, however, these curved surfaces 31 may be formed as flat surfaces instead. In the arrangement described herewith, the curved surfaces 12b provided on the sunshade 12 is also formed as flat surfaces.

The curved portion 33 may be omitted so that the corresponding portion 32 is formed in a straight line form extending in the vehicle width direction. In the arrangement described herewith, the front end portion 12a of the sunshade 12 makes contact with the entire portion of the corresponding portion 32. Accordingly, the amount of contact area between the corresponding portion 32 and the sunshade 12 increases. The upper surface portion 33a of the curved portion 33 may be formed as a flat surface.

The front end portion 12a of the sunshade 12 in the detailed description of the sunshade stopper 30 according to the first embodiment is rolled back and heading in the upward direction, however, the front end portion 12a may be formed without a portion being rolled back. The front end portion 12a may be formed in a flat form as an extension of the flat form of the sunshade 12.

The sunshade stopper 30 and the front housing 20 may be formed as separate units.

According to an aspect of this disclosure, the sunshade stopper 30 is provided at the front housing 20 connecting the pair of guide rails 11 that slidably supports the sunshade 12 on the ceiling of the vehicle interior and provides the open position and the closed position of the sunshade 12. The sunshade stopper 30 is arranged at the position to make contact with the front end portion 12a of the sunshade 12 during the sunshade 12 is at the closed position. The sunshade stopper 30 includes the corresponding portion 32 arranged at the position corresponding to the front end portion 12a of the sunshade 12 during the sunshade 12 is at the closed position. The sunshade stopper 30 also includes at least one curved surface 31 provided on the sunshade stopper 30 provided on the corresponding portion 32 that makes contact with at least a portion of the front end portion 12a of the sunshade 12 during the sunshade 12 is at the closed position, the curved surface 31 formed with a form fitting the front end portion 12a of the sunshade 12 that makes contact with the curved surface 31. The sunshade stopper 30 further includes the attaching portion 34 configured to be fixed to the vehicle, provided at the position in the direction opposite to where the ceiling is provided relative to the corresponding portion 32 and extending in the direction in which the sunshade 12 opens.

Accordingly, the sunshade stopper 30, furthermore the front housing 20, is retained to the vehicle at the attaching portion 34. The attaching portion 34 is provided at the position in the direction opposite to where the ceiling is provided relative to the corresponding portion 32 and extending in the direction in which the sunshade 12 opens. As a result, the attaching portion 34 functions as a blinder, which restrains the corresponding portion 32 from being sighted and recognized from the vehicle interior. The curved surface 31 provided on the sunshade stopper 30 of the corresponding portion 32 is provided with a form fitting the front end portion 12a that makes contact with the sunshade stopper 30. Accordingly, the amount of contact area is increased between the sunshade stopper 30 and the sunshade 12 during the sunshade 12 is at the closed position, so that the sunshade stopper 30 stably stops the sunshade 12 at the closed position.

According to another aspect of this disclosure, the corresponding portion 32 of the sunshade stopper 30 includes the central portion in the direction orthogonal to the direction the sunshade 12 slides formed with lower height in the vehicle height direction relative to opposing end portions of the corresponding portion 32.

In the state in which the sunshade 12 is at the open position, sighting and recognizing the central portion of the corresponding portion 32 from the vehicle interior is relatively easy relative to sighting and recognizing the opposing end portions of the corresponding portion 32. In the arrangement described herewith, the central portion of the corresponding portion 32 is formed with lower height relative to the opposing end portions of the corresponding portion 32. Accordingly, the attaching portion 34 reliably restrains, or limits, the corresponding portion 32 from being sighted and recognized from the vehicle interior even in a situation where the sunshade 12 is at the open position.

According to further aspect of this disclosure, the contact portion 31 of the sunshade stopper 30 is formed at each of the opposing end portions of the corresponding portion 32 in the direction orthogonal to the direction that the sunshade 12 slides. The portion of the corresponding portion 32 between the contact portions 31 is formed to increase distance between the corresponding portion 32 and the sunshade 12 as the position in the portion of the corresponding portion 32 between the contact portions 31 as being closer to the central portion in the direction orthogonal to the direction that the sunshade 12 slides.

In the arrangement described herewith, each of the curved surfaces 31 provided on the sunshade stopper 30 is formed at each of the opposing end portions of the corresponding portion 32. Accordingly, the sunshade 12 is restrained from being in a state in which the contact with the sunshade stopper 30 as being at one end only. The sunshade 12 makes contact with each of the curved surfaces 31, so that the sunshade stopper 30 stably stops the sunshade 12 at the closed position. The sunshade stopper 30 is formed such that the distance between the sunshade stopper 30 and the sunshade 12 increases as the position between each of the corresponding portions 32 as being closer to the central portion in the vehicle width direction. Accordingly, even in the state where the sunshade 12 is at the open position, the attaching portion 34 provides the state where the corresponding portion 32 is further restrained from being sighted and recognized from the vehicle interior.

According to another aspect of this disclosure, the curved surfaces 31 of the sunshade stopper 30 are formed as surfaces that increase extending length in the direction in which the sunshade opens as a position in the curved surfaces 31 as being closer to the guide rails 11.

In the arrangement described herewith, the curved surfaces 31 provided on the sunshade stopper 30 are formed as surfaces such that extending length in the direction in which the sunshade 12 opens increase as a position in the curved surfaces 31 as being closer to the guide rails 11. Accordingly, each of the curved surfaces 31 restrains the sunshade 12 at the closed position from misalignment in the direction orthogonal to the direction the sunshade 12 slides. Accordingly, the sunshade stopper 30 stably stops the sunshade 12 at the closed position.

According to further aspect of this disclosure, the sunshade stopper 30 makes contact with the end portion 12a of the sunshade 12 rolled back and heading in the vehicle height direction.

In the arrangement described herewith, the front end portion 12a of the sunshade 12 is formed such that the front end portion 12a is rolled back and heading in the height direction of the vehicle. As a result, the amount of contact area between the front end portion 12a and the curved surfaces 31 provided on the sunshade stopper 30 is increased. Accordingly, the sunshade stopper 30 stably stops the sunshade 12 at the closed position.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A sunshade stopper provided at a housing connecting a pair of guide rails that supports a sunshade to slide between its open and closed positions relative to a ceiling of a vehicle interior and provides an open position and a closed position of the sunshade, the sunshade stopper arranged at a position to make contact with an end portion of the sunshade during the sunshade is at the closed position, comprising:

a corresponding portion arranged at a position corresponding to the end portion of the sunshade during the sunshade is at the closed position;
at least one contact portion provided on the corresponding portion that makes contact with at least a portion of the end portion of the sunshade during the sunshade is at the closed position, the contact portion formed with a form fitting the end portion of the sunshade that makes contact with the contact portion; and
an attaching portion configured to be fixed to a vehicle, provided at a position in a direction opposite to where the ceiling is provided relative to the corresponding portion and extending in a direction in which the sunshade opens,
wherein the corresponding portion includes a central portion in a direction orthogonal to the direction the sunshade slides formed with lower height in a vehicle height direction relative to opposing end portions of the corresponding portion.

2. The sunshade stopper according to claim 1, wherein the contact portion is formed at each of the opposing end portions of the corresponding portion in the direction orthogonal to the direction that the sunshade slides, and wherein a portion of the corresponding portion between the contact portions is formed to increase distance between the corresponding portion and the sunshade as a position in the portion of the corresponding portion between the contact portions as being closer to the central portion in the direction orthogonal to the direction that the sunshade slides.

3. The sunshade stopper according to claim 2, wherein the contact portions are formed as surfaces that increase extending length in the direction in which the sunshade opens as a position in the contact portions as being closer to the guide rails.

4. The sunshade stopper according to claim 1, wherein the sunshade stopper makes contact with the end portion of the sunshade rolled back and heading in the vehicle height direction.

* * * * *

UNITED STATES PATENT AND TRADEMARK OFFICE
CERTIFICATE OF CORRECTION

| | |
|---|---|
| PATENT NO. | : 8,727,431 B2 |
| APPLICATION NO. | : 13/658145 |
| DATED | : May 20, 2014 |
| INVENTOR(S) | : Youji Nagashima et al. |

It is certified that error appears in the above-identified patent and that said Letters Patent is hereby corrected as shown below:

On the Title Page, Item (71), change "Applicants: Youji Nagashima, Kariya (JP); Masaji Ishikawa, Toyoake (JP)" to "Applicant: Aisin Seiki Kabushiki Kaisha, Kariya-shi, (JP)"

Signed and Sealed this
Fourteenth Day of October, 2014

Michelle K. Lee
*Deputy Director of the United States Patent and Trademark Office*